United States Patent
Lee et al.

(10) Patent No.: US 10,127,857 B2
(45) Date of Patent: Nov. 13, 2018

(54) TEMPERATURE ESTIMATING APPARATUS, A METHOD OF ESTIMATING A TEMPERATURE, AND A DISPLAY SYSTEM INCLUDING THE TEMPERATURE ESTIMATING APPARATUS

(71) Applicant: SAMSUNG DISPLAY CO., LTD., Yongin-si, Gyeonggi-Do (KR)

(72) Inventors: Jin-Ho Lee, Cheonan-si (KR); So-Young Kim, Seoul (KR); Woo-Seok Jang, Suwon-si (KR); Man-Bok Cheon, Yongin-si (KR); Seung-Ho Park, Suwon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 126 days.

(21) Appl. No.: 15/401,697

(22) Filed: Jan. 9, 2017

(65) Prior Publication Data
US 2017/0206834 A1 Jul. 20, 2017

(30) Foreign Application Priority Data

Jan. 20, 2016 (KR) .................. 10-2016-0006931

(51) Int. Cl.
*G09G 3/3208* (2016.01)
*G09G 3/20* (2006.01)
*G01K 13/00* (2006.01)

(52) U.S. Cl.
CPC .......... *G09G 3/3208* (2013.01); *G01K 13/00* (2013.01); *G09G 3/2018* (2013.01);
(Continued)

(58) Field of Classification Search
CPC ......... G09G 2320/041; G09G 2360/16; G09G 2320/0233; G09G 3/3233
See application file for complete search history.

(56) References Cited

U.S. PATENT DOCUMENTS

2010/0253675 A1* 10/2010 Furukawa ............ G09G 3/3648
　　　　　　　　　　　　　　　　　　　　　　345/214
2014/0354185 A1* 12/2014 Yoshida ................ G01K 7/427
　　　　　　　　　　　　　　　　　　　　　　315/309

(Continued)

FOREIGN PATENT DOCUMENTS

KR　　10-2005-0016195　　2/2005

*Primary Examiner* — Gerald Johnson
(74) *Attorney, Agent, or Firm* — F. Chau & Associates, LLC

(57) ABSTRACT

A temperature estimating apparatus includes an average data outputting circuit configured to output average data of image data displayed on a display panel. The temperature estimating apparatus further includes a change amount outputting circuit configured to determine a change amount of the average data, and to output an average data change amount. The temperature estimating apparatus additionally includes a luminance outputting circuit configured to convert the average data change amount to a luminance, and to output the luminance. The temperature estimating apparatus further includes a temperature sensor configured to sense an ambient temperature of the display panel, and to output the ambient temperature. The temperature estimating apparatus additionally includes a current temperature outputting circuit configured to determine a current temperature of the display panel based on a previous temperature of the display panel, the luminance and the ambient temperature.

20 Claims, 11 Drawing Sheets

(52) U.S. Cl.
CPC ............... *G09G 2320/0257* (2013.01); *G09G 2320/041* (2013.01); *G09G 2360/145* (2013.01)

(56) References Cited

U.S. PATENT DOCUMENTS

2016/0351133 A1\* 12/2016 Kim ..................... G09G 3/3406
2017/0124959 A1\* 5/2017 Kim ..................... G09G 3/3225
2017/0278464 A1\* 9/2017 Guo ..................... G09G 3/3413

\* cited by examiner ation No. 10-2016-0006931 filed on

TEMPERATURE ESTIMATING APPARATUS, A METHOD OF ESTIMATING A TEMPERATURE, AND A DISPLAY SYSTEM INCLUDING THE TEMPERATURE ESTIMATING APPARATUS

CROSS-REFERENCE TO RELATED APPLICATION

This application claims priority under 35 U.S.C. § 119 to Korean Patent Application No. 10-2016-0006931 filed on Jan. 20, 2016 in the Korean Intellectual Property Office (KIPO), the disclosure of which is incorporated by reference herein in its entirety.

TECHNICAL FIELD

One or more exemplary embodiments of the present inventive concept relate to a display apparatus, and more particularly, to a temperature estimating apparatus, a method of estimating a temperature, and a display system including the temperature estimating apparatus.

DISCUSSION OF THE RELATED ART

A display apparatus includes a display panel and a display panel driving apparatus. The display panel displays image data that may have been received from an external device (e.g., a graphic processing unit). The display panel driving apparatus drives the display panel.

When transitioning between images based on the image data, an afterimage of a previous image may be displayed on the display panel. The afterimage may decrease display quality of the display apparatus. Accordingly, the afterimage may need to be compensated. In one technique, a plurality of temperature sensors may be attached to the display panel.

SUMMARY

According to an exemplary embodiment of the present inventive concept, a temperature estimating apparatus includes an average data outputting circuit configured to output average data of image data displayed on a display panel. The temperature estimating apparatus further includes a change amount outputting circuit configured to determine a change amount of the average data, and to output an average data change amount. The temperature estimating apparatus additionally includes a luminance outputting circuit configured to convert the average data change amount to a luminance, and to output the luminance. The temperature estimating apparatus further includes a temperature sensor configured to sense an ambient temperature of the display panel, and to output the ambient temperature. The temperature estimating apparatus additionally includes a current temperature outputting circuit configured to determine a current temperature of the display panel based on a previous temperature of the display panel, the luminance and the ambient temperature.

In an exemplary embodiment of the present inventive concept, the current temperature outputting circuit determines the current temperature by using a formula, 'CT=PT+ TC−AT'. 'CT' denotes the current temperature, 'PT' denotes the previous temperature, 'TC' denotes a temperature change amount based on the luminance, and 'AT' denotes the ambient temperature.

In an exemplary embodiment of the present inventive concept, the ambient temperature is the same as a temperature of the display panel when the display panel displays a black image.

In an exemplary embodiment of the present inventive concept, the temperature estimating apparatus further includes a sensor compensating circuit configured to adjust the ambient temperature to be the same as a temperature of the display panel when the display displays a black image.

In an exemplary embodiment of the present inventive concept, the change amount outputting circuit outputs the average data change amount during a first time, and the current temperature outputting circuit determines a temperature change amount of the display panel during the first time and outputs the current temperature.

In an exemplary embodiment of the present inventive concept, the current temperature outputting circuit includes a look-up table configured to store the temperature change amount of the display panel with respect to the previous temperature of the display panel.

In an exemplary embodiment of the present inventive concept, when the average data increases during the first time, the temperature change amount increases based on a decrease of the previous temperature.

In an exemplary embodiment of the present inventive concept, when the previous temperature is greater than or equal to a first threshold temperature, the temperature change amount is about zero.

In an exemplary embodiment of the present inventive concept, when the average data decreases after the first time, the temperature change amount decreases based on a decrease of the previous temperature.

In an exemplary embodiment of the present inventive concept, when the previous temperature is greater than or equal to a second threshold temperature, the temperature change amount is substantially constant.

In an exemplary embodiment of the present inventive concept, the current temperature outputting circuit includes a first grayscale look-up table configured to store the temperature change amount of the display panel with respect to the previous temperature of the display panel, when a grayscale of the image data is changed to a first grayscale that is a maximum grayscale.

In an exemplary embodiment of the present inventive concept, the temperature change amount of the display panel decreases when the grayscale of the image data is changed to a second grayscale less than the first grayscale.

In an exemplary embodiment of the present inventive concept, the current temperature outputting circuit further includes a second grayscale look-up table configured to store the temperature change amount of the display panel with respect to the previous temperature of the display panel, when the grayscale of the image data is changed to a second grayscale less than the first grayscale.

In an exemplary embodiment of the present inventive concept, the current temperature outputting circuit determines the temperature change amount of the display panel by using the first grayscale look-up table and the second grayscale look-up table, when the grayscale of the image data is changed to a third grayscale that is greater than the first grayscale and less than the second grayscale.

In an exemplary embodiment of the present inventive concept, the current temperature outputting circuit includes a first ambient temperature look-up table configured to store the temperature change amount of the display panel with respect to the previous temperature of the display panel, when the ambient temperature is a first ambient temperature.

In an exemplary embodiment of the present inventive concept, the current temperature outputting circuit further includes a second ambient temperature look-up table configured to store the temperature change amount of the display panel with respect to the previous temperature of the display panel, when the ambient temperature is a second ambient temperature different from the first ambient temperature.

In an exemplary embodiment of the present inventive concept, the temperature change amount of the display panel decreases when there is an increase of the ambient temperature.

In an exemplary embodiment of the present inventive concept, the display panel includes a plurality of blocking units, the average data outputting circuit outputs the average data of the image data in a block unit of the plurality of block units, the change amount outputting circuit outputs the average data change amount in the block unit, the luminance outputting circuit outputs the luminance in the block unit, and the current temperature outputting circuit estimates and outputs the current temperature of the block unit.

According to an exemplary embodiment of the present inventive concept, A method of estimating a temperature includes outputting average data of image data displayed on a display panel, determining a change amount of the average data and outputting an average data change amount, and converting the average data change amount to a luminance and outputting the luminance. The method of estimating the temperature further includes sensing an ambient temperature of the display panel and outputting the ambient temperature, and determining a current temperature of the display panel based on a previous temperature of the display panel, the luminance and the ambient temperature and outputting the current temperature of the display panel.

According to an exemplary embodiment of the present inventive concept, a display system includes a display apparatus including a display panel configured to display image data, and a display panel driving apparatus configured to drive the display panel, and a temperature estimating apparatus. The temperature estimating apparatus includes an average data outputting circuit configured to output average data of image data displayed on the display panel. The temperature estimating apparatus further includes a change amount outputting circuit configured to determine a change amount of the average data, and to output an average data change amount. The temperature estimating apparatus additionally includes a luminance outputting circuit configured to convert the average data change amount to a luminance, and to output the luminance. The temperature estimating apparatus additionally includes a temperature sensor configured to sense an ambient temperature of the display panel, and to output the ambient temperature. The temperature estimating apparatus further includes a current temperature outputting circuit configured to store a previous temperature of the display panel, to estimate a current temperature of the display panel based on the previous temperature, the luminance and the ambient temperature, and to output the current temperature of the display panel. The display system further includes an afterimage compensating apparatus configured to compensate the image data by using the current temperature of the display panel as an afterimage acceleration coefficient.

BRIEF DESCRIPTION OF THE DRAWINGS

The above and other features of the present inventive concept will become more apparent by describing, in detail, exemplary embodiments thereof with reference to the accompanying drawings, in which.

DETAILED DESCRIPTION OF THE EMBODIMENTS

Hereinafter, exemplary embodiments the present inventive concept will be described more fully with reference to the accompanying drawings.

Figure 1:
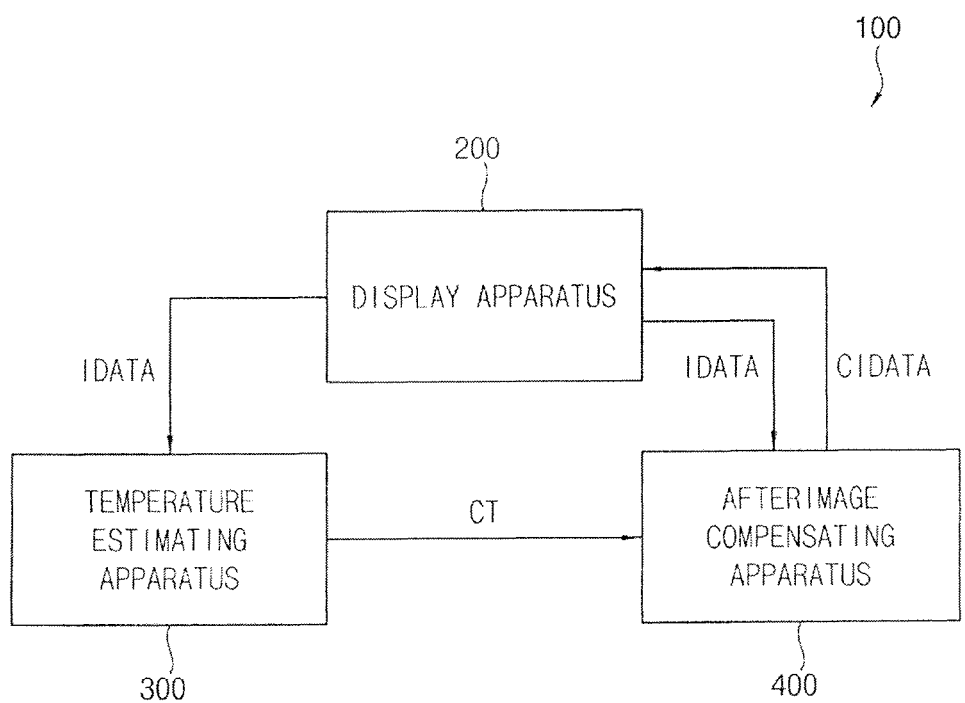
FIG. 1 is a block diagram illustrating a display system according to an exemplary embodiment of the present inventive concept.

FIG. 1 is a block diagram illustrating a display system 100 according to an exemplary embodiment of the present inventive concept.

Referring to FIG. 1, the display system 100 according to the present exemplary embodiment includes a display apparatus 200, a temperature estimating apparatus 300 and an afterimage compensation apparatus 400.

The display apparatus 200 displays image data IDATA received from an external device (e.g., a graphic processing unit).

Figure 2:
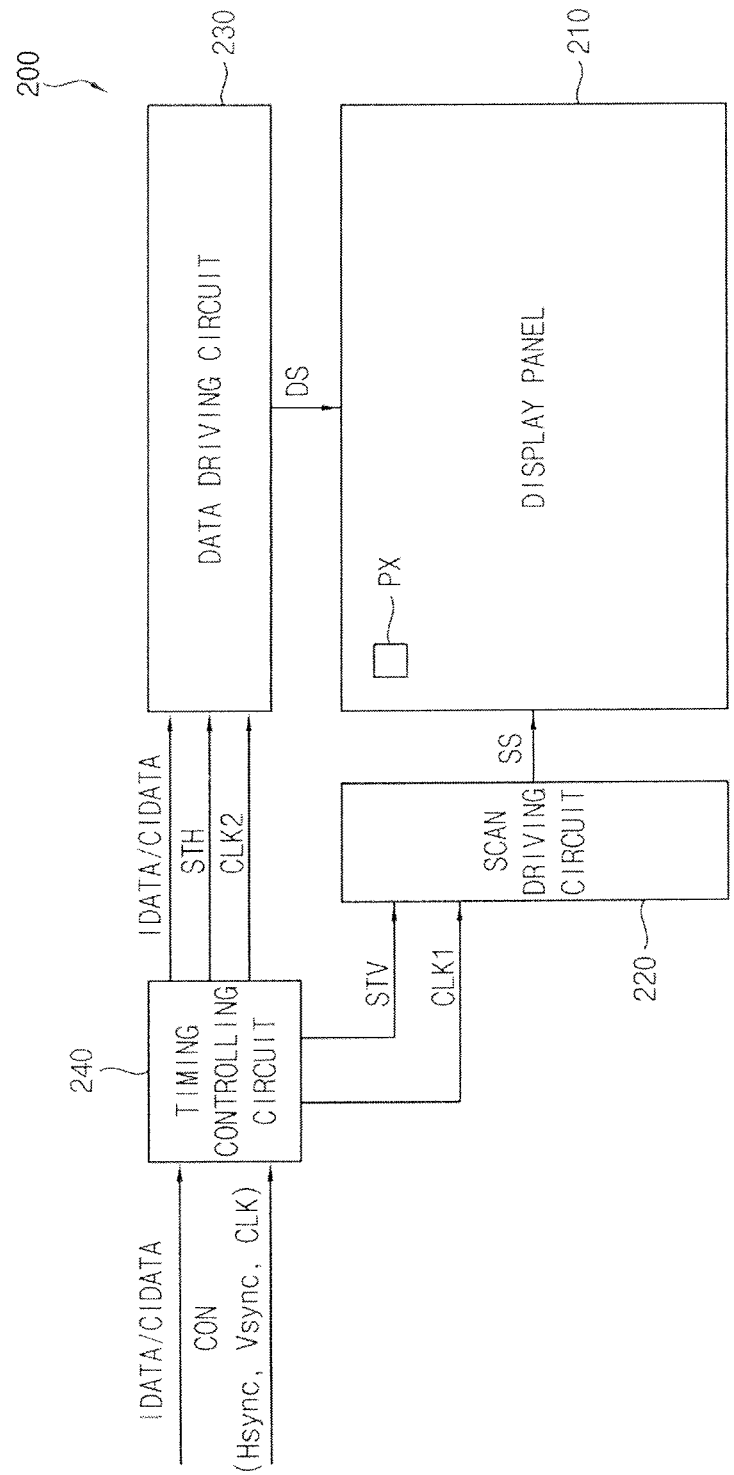
FIG. 2 is a block diagram illustrating a display apparatus of FIG. 1 according to an exemplary embodiment of the present inventive concept.

FIG. 2 is a block diagram illustrating the display apparatus 200 of FIG. 1 according to an exemplary embodiment of the present inventive concept.

Referring to FIGS. 1 and 2, the display apparatus 200 includes a display panel 210, a scan driving circuit 220, a data driving circuit 230 and a timing controlling circuit 240.

The display panel 210 may receive a data signal DS based on the image data IDATA and/or compensation image data CIDATA provided from the timing controlling circuit 240 to display an image. For example, the display panel 210 may be a transparent display panel. The display panel 210 includes a plurality of pixels PX.

Figure 3:
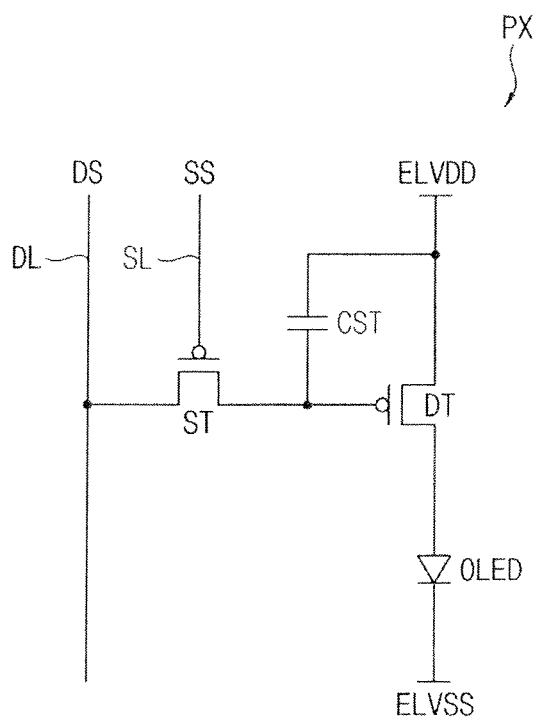
FIG. 3 is a circuit diagram illustrating a pixel of FIG. 2 according to an exemplary embodiment of the present inventive concept.

FIG. 3 is a circuit diagram illustrating the pixel PX of FIG. 2 according to an exemplary embodiment of the present inventive concept.

Referring to FIGS. 1 to 3, the pixel PX may include a switching transistor ST, a storage capacitor CST, a driving transistor DT and an Organic Light Emitting Diode (OLED).

The switching transistor ST may include a first electrode connected to a data line DL to receive the data signal DS, a second electrode connected to the storage capacitor CST, and a gate electrode connected to a scan line SL to receive a scan signal SS. The switching transistor ST may transmit the data signal DS provided from the data driving circuit 230 to the storage capacitor CST when the scan signal SS is transmitted from the scan driving circuit 220.

The storage capacitor CST may include a first electrode connected to a terminal to which a high-power voltage ELVDD is applied and a second electrode connected to a gate electrode of the driving transistor DT. The storage capacitor CST may store a voltage of the data signal DS transmitted through the switching transistor ST.

The driving transistor DT may include a first electrode connected to the terminal to which the high-power voltage ELVDD is applied, a second electrode connected to the OLED, and a gate electrode connected to the second electrode of the storage capacitor CST. The driving transistor DT may be turned on or turned off in response to the data signal DS stored in the storage capacitor CST.

The OLED may include an anode electrode connected to the driving transistor DT, and a cathode electrode connected to a terminal to which a low power voltage ELVSS is applied. The OLED may emit light based on a current flowing from the high-power voltage ELVDD to a low power voltage ELVSS, while the driving transistor DT is turned on.

The scan driving circuit 220 generates the scan signal SS in response to a vertical start signal STV and a first clock signal CLK1 provided from the timing controlling circuit 240, and outputs the scan signal SS to the scan line SL.

The data driving circuit 230 outputs the data signals DS to the data line DL in response to a horizontal start signal STH and a second clock signal CLK2 provided from the timing controlling circuit 240.

The timing controlling circuit 240 may receive the image data IDATA and a control signal CON from an external device. In addition, the timing controlling circuit 240 may receive the compensation image data CIDATA from the afterimage compensating apparatus 400. The timing controlling circuit 240 may output the image data IDATA and/or the compensation image data CIDATA to the data driving circuit 230. The control signal CON may include a horizontal synchronous signal Hsync, a vertical synchronous signal Vsync and a clock signal CLK. The timing controlling circuit 240 generates the horizontal start signal STH in response to the horizontal synchronous signal Hsync and outputs the horizontal start signal STH to the data driving circuit 230. In addition, the timing controlling circuit 240 generates the vertical start signal STV in response to the vertical synchronous signal Vsync and outputs the vertical start signal STV to the gate driving circuit 220. In addition, the timing controlling circuit 240 generates the first clock signal CLK1 and the second clock signal CLK2 using the clock signal CLK, outputs the first clock signal CLK1 to the gate driving circuit 220, and outputs the second clock signal CLK2 to the data driving circuit 230.

The temperature estimating apparatus 300 estimates and outputs a current temperature CT of the display panel 210 based on the image data IDATA displayed on the display panel 210.

The afterimage compensating apparatus 400 receives the current temperature CT of the display panel 210 from the temperature estimating apparatus 300. The afterimage compensating apparatus 400 may compensate the image data IDATA when an afterimage is displayed on the display panel 210 by using the current temperature CT of the display panel 210 to output the compensation image data CIDATA to the display apparatus 200. For example, the afterimage compensating apparatus 400 may use the current temperature CT of the display panel 210 as an afterimage acceleration coefficient.

According to an exemplary embodiment of the present inventive concept, at least one of the temperature estimating apparatus 300 and the afterimage compensating apparatus 400 may be included in the timing controlling circuit 240 of the display apparatus 200.

Figure 4:
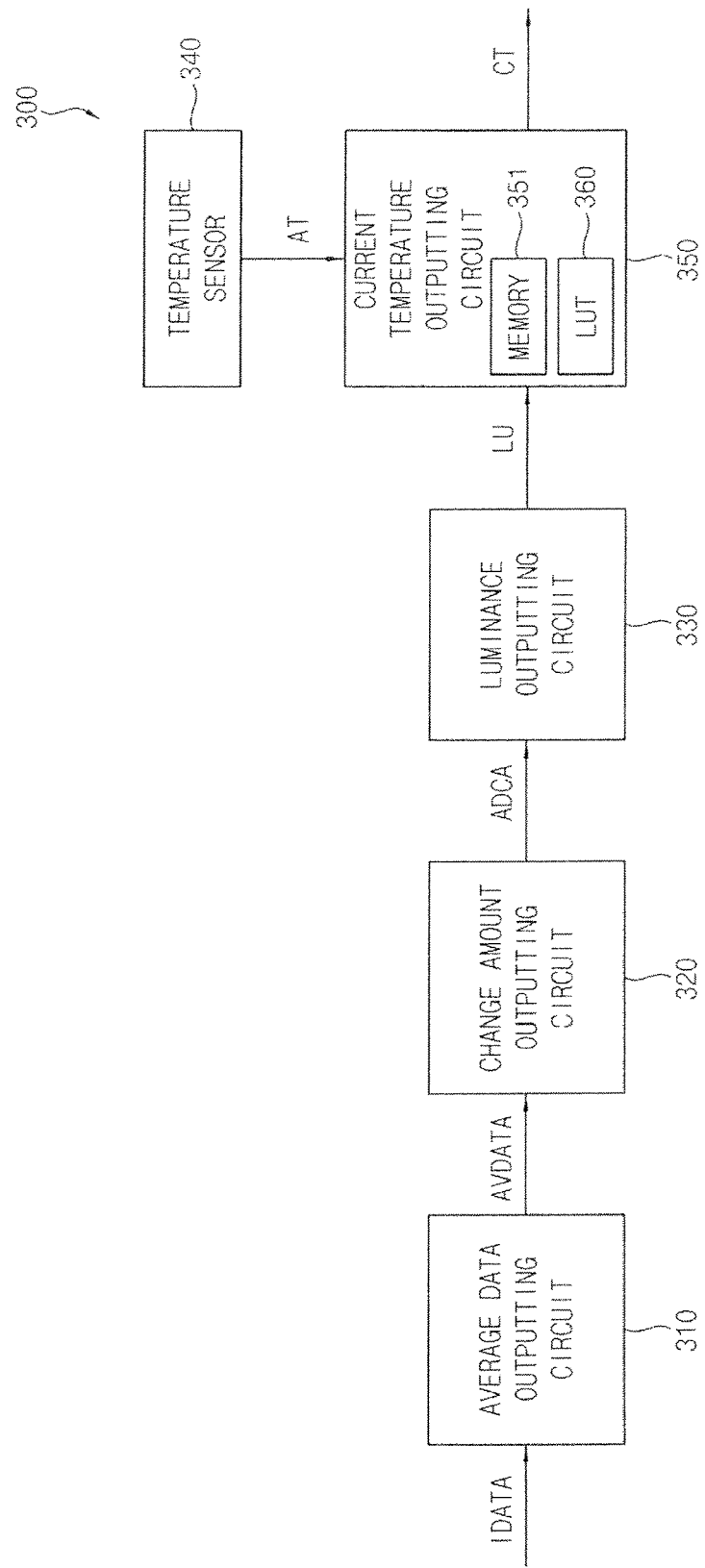
FIG. 4 is a block diagram illustrating a temperature estimating apparatus of FIG. 1 according to an exemplary embodiment of the present inventive concept.

FIG. 4 is a block diagram illustrating the temperature estimating apparatus 300 of FIG. 1 according to an exemplary embodiment of the present inventive concept.

Referring to FIGS. 1, 2 and 4, the temperature estimating apparatus 300 may include an average data outputting circuit 310, a change amount outputting circuit 320, a luminance outputting circuit 330, a temperature sensor 340 and a current temperature outputting circuit 350. More than one temperature sensor 340 may be included in the temperature estimating apparatus 300.

The average data outputting circuit 310 receives the image data IDATA from the display apparatus 200. The average data outputting circuit 310 calculates and outputs average data AVDATA of the image data IDATA displayed on the display panel 210. For example, the average data outputting circuit 310 may receive the image data IDATA from the timing controlling circuit 240 of the display apparatus 200.

The change amount outputting circuit 320 receives the average data AVDATA from the average data outputting circuit 310. The change amount outputting circuit 320 determines a change amount of the average data AVDATA (e.g., an amount of change in the average data AVDATA) and outputs an average data change amount ADCA.

The luminance outputting circuit 330 receives the average data change amount ADCA from the change amount outputting circuit 320. The luminance outputting circuit 330 converts the average data change amount ADCA into a luminance LU and outputs the luminance LU. The luminance LU may be received by the current temperature outputting circuit 350.

The temperature sensor 340 senses an ambient temperature AT of the display panel 210 and outputs the ambient temperature AT. The ambient temperature AT may be the same as a temperature of the display panel 210 when the image data IDATA corresponds to black image data. Black image data refers to the case where the display panel 210 displays a black image. According to an exemplary embodiment, the temperature estimating apparatus 300 may further include a sensor compensating circuit. The sensor compensating circuit compensates the ambient temperature AT so that the ambient temperature AT may be the same as the temperature of the display panel 210 when the display panel 210 displays the black image.

The current temperature outputting circuit 350 receives the luminance LU from the luminance outputting circuit 330, and receives the ambient temperature AT from the temperature sensor 340. The current temperature outputting circuit 350 includes a memory 351 that stores a previous temperature of the display panel 210. For example, the previous temperature may be a previous measure of the current temperature CT. Further, in an exemplary embodiment of the present inventive concept, the memory 351 of the current temperature outputting circuit 350 may store the ambient temperature AT taken at a particular time. The current temperature outputting circuit 350 estimates and outputs the current temperature CT of the display panel 210 based on the previous temperature, the luminance LU and the ambient temperature AT. The current temperature outputting circuit 350 may output the current temperature CT according to Equation 1.

$$CT=PT+TC-AT \qquad \text{[Equation 1]}$$

Here, 'CT' denotes the current temperature CT of the display panel 210, 'PT' denotes the previous temperature of the display panel 210, 'TC' denotes a change in temperature based on the luminance LU, and 'AT' denotes the ambient temperature AT.

Figure 5:
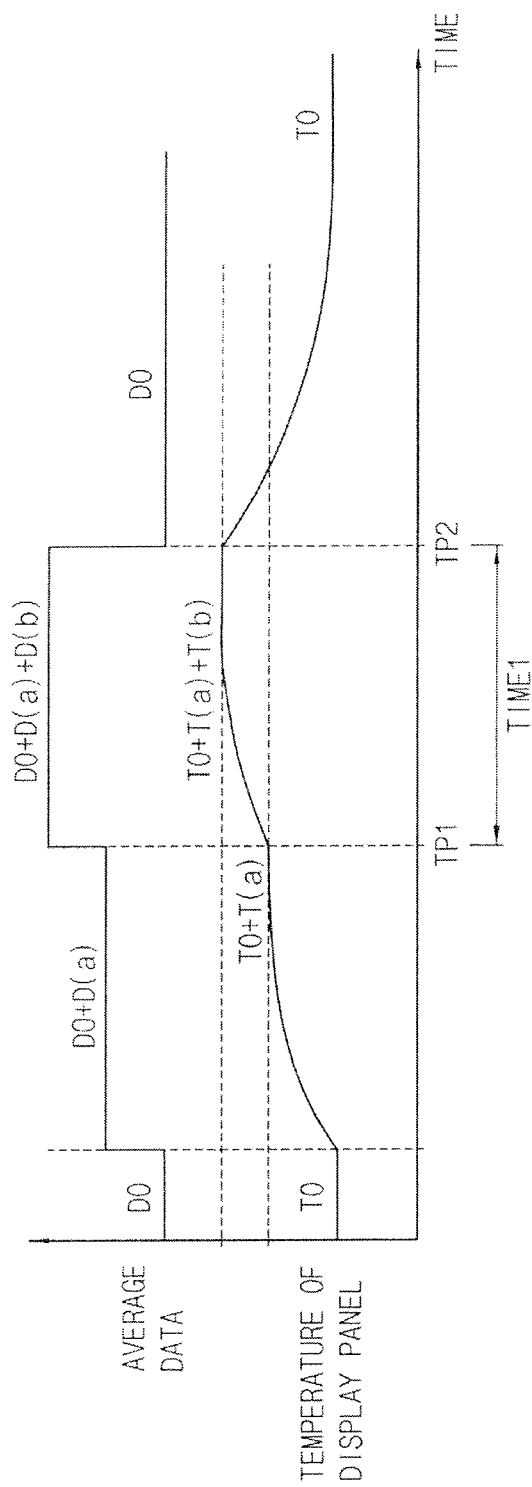
FIG. 5 is a graph illustrating average data of FIG. 4 and temperature of a display panel of FIG. 2.

FIG. 5 is a graph illustrating the average data AVDATA of FIG. 4 and the temperature of the display panel 210 of FIG. 2.

Referring to FIGS. 1, 2, 4 and 5, at an initial time point, the average data AVDATA may be 'D0' and the temperature of the display panel 210 may be 'T0'. Further, the average data AVDATA may be 'D0+D(a)' and the temperature of the display panel 210 may be 'T0+T(a)' at a first time point TP1. For example, the average data outputting circuit 310 may output the average data AVDATA of 'D0+D(a)' at the first time point TP1, and the current temperature outputting circuit 350 may store 'T0+T(a)' in the memory 351 as the previous temperature corresponding to the first time point TP1.

The average data AVDATA may be 'D0+D(a)+D(b)' at a second time point TP2 after the first time point TP1. For example, the average data outputting circuit 310 may output the average data AVDATA of 'D0+D(a)+D(b)' at the second time point TP2. Further, the change amount outputting circuit 320 may output 'D(b)' which is the average data change amount ADCA during a first time TIME1 between the first time point TP1 and the second time point TP2 (e.g., (D0+D(a)+D(b))−(D0+D(a))=D(b)). The luminance outputting circuit 330 may output the luminance LU by converting the 'D(b)' (e.g., the average data change amount ADCA) into the luminance LU. The current temperature outputting circuit 350 may output 'T0+T(a)+T(b)' as the current temperature CT by adding the 'T(b)', which is a change in temperature corresponding to a change in luminance LU between the luminance LU of 'T0+T(a)' (e.g., corresponding to 'D(a)', an average data change amount for a previous time) and the luminance LU of 'D(b)'. Thus, the current temperature outputting circuit 350 may estimate a temperature change of the display panel 210 during the first time TIME1 and may output the current temperature CT.

The current temperature outputting circuit 350 may further include a look-up table 360 that stores the temperature change amount of the display panel 210 based on the previous temperature of the display panel 210.

Figure 6A:
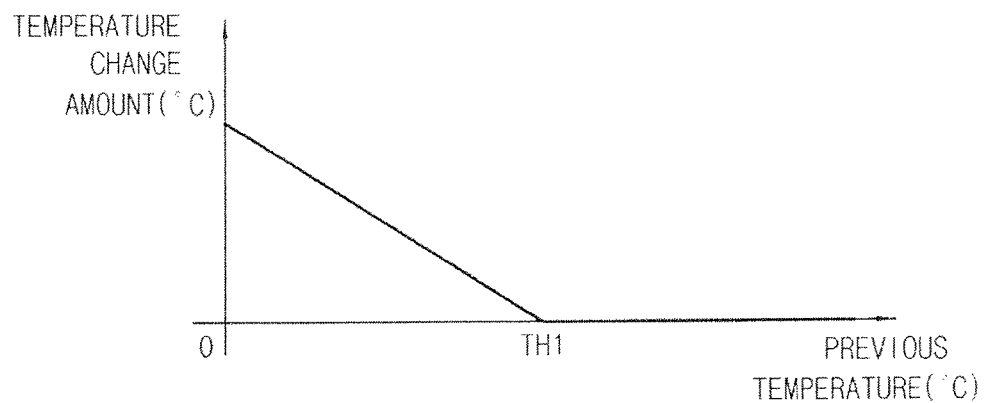
FIGS. 6A, 6B and 6C are graphs illustrating temperature change amounts of the display panel according to a previous temperature of the display panel, which is stored in a look-up table of FIG. 4.
Figure 6B:
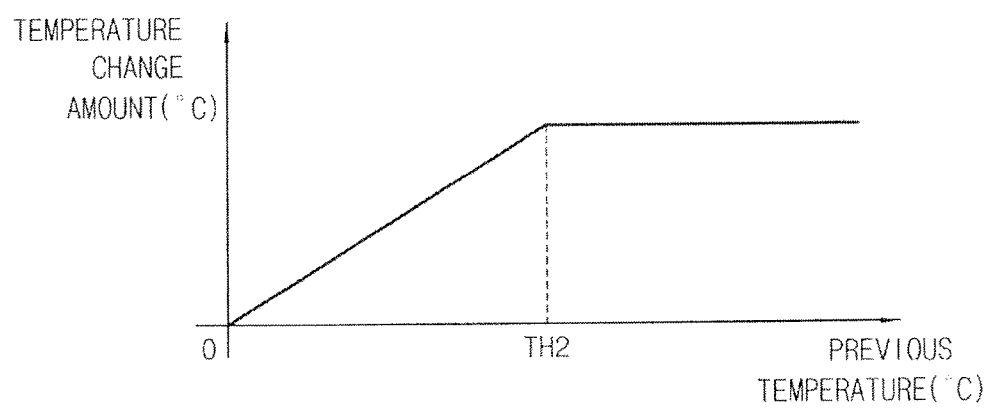
Figure 6C:
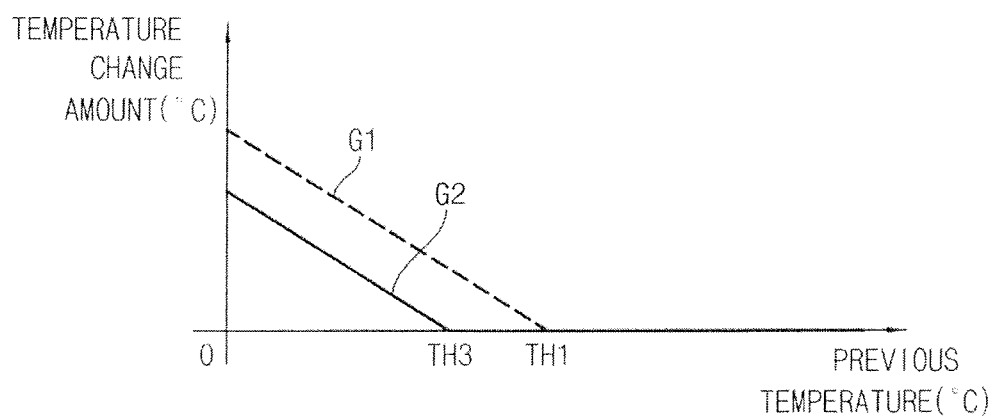

FIGS. 6A to 6C are graphs illustrating the temperature change amounts of the display panel 210 based on the previous temperature of the display panel 210, which is stored in the look-up table 360 of FIG. 4.

Referring to FIGS. 1, 2 and 4 to 6A, when the average data AVDATA increases during the first time TIME1, the temperature change amount may increase based on a lower previous temperature. In addition, when the previous temperature is greater than or equal to a first threshold temperature TH1, the temperature change amount may be about zero. A slope of the graph illustrating a relationship between the previous temperature and the temperature change amount shown in FIG. 6A may be changed. For example, the slope of the graph illustrating the relationship between the previous temperature and the temperature change amount may be changed based on a temperature characteristic change according to a color coordinate change of the image data IDATA.

Referring to FIGS. 1, 2 and 4, 5, 6B, when the average data AVDATA decreases after the first time TIME1 (e.g., decreases to 'D0'), the temperature change amount may decrease based on the decrease of the previous temperature. In addition, when the previous temperature is greater than or equal to a second threshold temperature TH2, the temperature change amount may be consistent. A slope of the graph illustrating a relationship between the previous temperature and the temperature change amount shown in FIG. 6B may be changed. For example, the slope of the graph illustrating the relationship between the previous temperature and the temperature change amount may be changed based on a temperature characteristic change according to a color coordinate change of the image data IDATA.

Referring to FIGS. 1, 2, 4, 5 and 6C, the look-up table 360 may store the temperature change amount of the display panel 210 based on the previous temperature of the display panel 210, in which a grayscale of the image data IDATA is changed to a first grayscale that is a maximum grayscale.

The temperature change amount based on the previous temperature, in which the grayscale of the image data IDATA is changed to the first grayscale, may correspond to a first graph G1.

When the grayscale of the image data IDATA1 is changed to a second grayscale less than the first grayscale, the temperature change based on the previous temperature may decrease in proportion to a difference between the first grayscale and the second grayscale. In addition, when the previous temperature is greater than or equal to a third threshold temperature TH3, the temperature change amount may be about zero. Thus, the temperature change amount based on the previous temperature, in which the grayscale of the image data IDATA is changed to the second grayscale, may correspond to a second graph G2.

Figure 7:
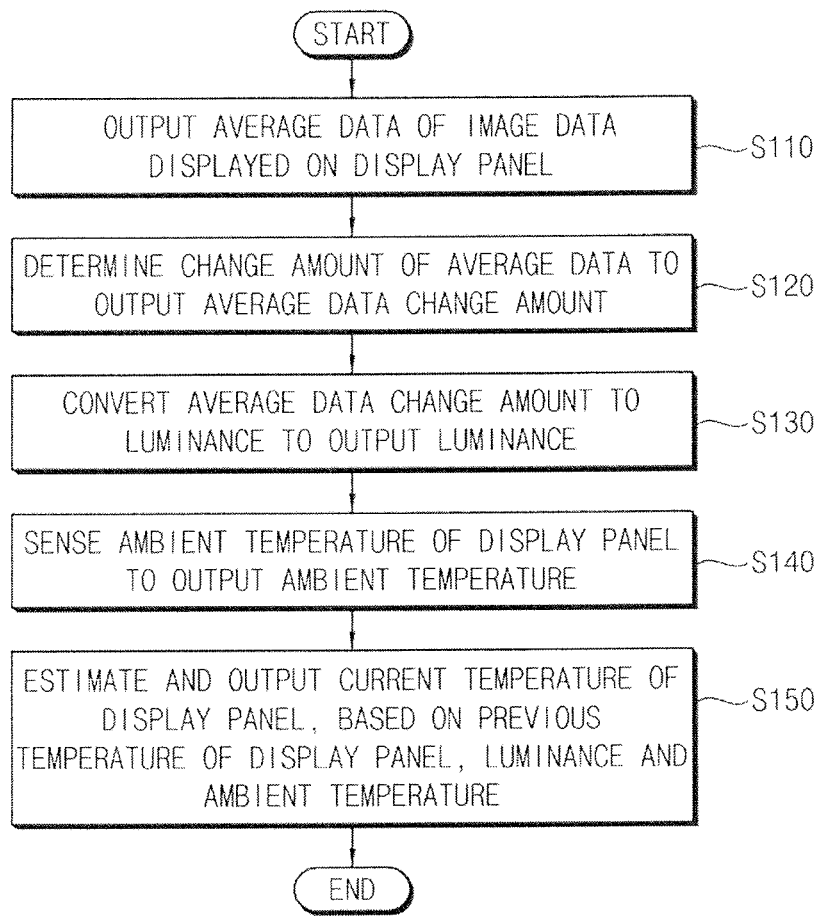
FIG. 7 is a flow chart illustrating a method of estimating a temperature using the temperature estimating apparatus of FIGS. 1 and 4 according to an exemplary embodiment of the present inventive concept.

FIG. 7 is a flow chart illustrating a method of estimating a temperature using the temperature estimating apparatus 300 of FIGS. 1 and 4 according to an exemplary embodiment of the present inventive concept.

Referring to FIGS. 2, 4 and 7, the average data AVDATA of the image data IDATA displayed on the display panel 210 is outputted (S110). For example, the average data outputting circuit 310 receives the image data IDATA from the display apparatus 200. The average data outputting circuit 310 calculates and outputs the average data AVDATA of the image data IDATA displayed on the display panel 210.

The change amount of the average data AVDATA is determined and the average data change amount ADCA is outputted (S120). For example, change amount outputting circuit 320 receives the average data AVDATA from the average data outputting circuit 310. The change amount outputting circuit 320 determines the change amount of the average data AVDATA and outputs the average data change amount ADCA.

The average data change amount ADCA is converted into the luminance LU and the luminance LU is outputted (S130). For example, the luminance outputting circuit 330 receives the average data change amount ADCA from the change amount outputting circuit 320. The luminance outputting circuit 330 converts the average data change amount ADCA into the luminance LU and outputs the luminance LU.

The ambient temperature AT of the display panel 210 is sensed and the ambient temperature AT is outputted (S140). For example, the temperature sensor 340 senses the ambient temperature AT of the display panel 210 and outputs the ambient temperature AT.

The current temperature CT of the display panel 210 is estimated and outputted, based on the previous temperature of the display panel 210, the luminance LU and the ambient temperature AT (S150). For example, current temperature outputting circuit 350 receives the luminance LU from the luminance outputting circuit 330, and receives the ambient temperature AT from the temperature sensor 340. The current temperature outputting circuit 350 includes the memory 351 that stores the previous temperature of the display panel 210. The current temperature outputting circuit 350 estimates and outputs the current temperature CT of the display panel 210 based on the previous temperature, the luminance LU and the ambient temperature AT.

Figure 8:
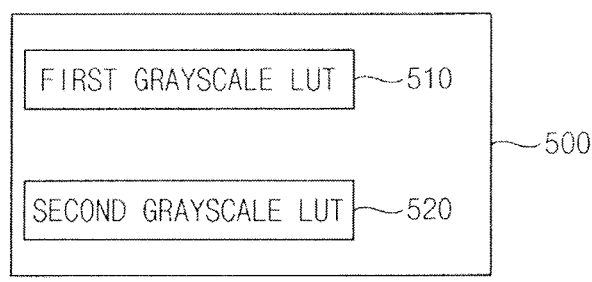
FIG. 8 is a block diagram illustrating a look-up table according to an exemplary embodiment of the present inventive concept.

FIG. 8 is a block diagram illustrating a look-up table according to an exemplary embodiment of the present inventive concept.

In FIG. 8, the look-up table 500, according to an exemplary embodiment of the present inventive concept, may be included in the current temperature outputting circuit 350 of the temperature estimating apparatus 300 according to an exemplary embodiment of the present inventive concept illustrated in FIG. 4. The temperature estimating apparatus 300 including the look-up table 500 may be substantially the same as the temperature estimating apparatus 300 according to an exemplary embodiment of the present inventive concept illustrated in FIG. 4 except for the look-up table 500. Thus, the same reference numerals will be used to refer to same or similar elements as those described in previous exemplary embodiments and any further repetitive explanation concerning the above elements will be omitted.

Referring to FIGS. 4 and 8, the look-up table 500 may include a first grayscale look-up table 510 and a second grayscale look-up table 520. The first grayscale look-up table 510 may store the temperature change amount based on the previous temperature of a case in which the grayscale of the image data IDATA is changed to the first grayscale that is the maximum grayscale. For example, the first grayscale may be about 255 grayscale. The second grayscale look-up table 520 may store the temperature change amount based on the previous temperature of a case in which the grayscale of the image data IDATA is changed to a second grayscale less than the first grayscale. For example, the second grayscale may be about 218 grayscale.

Figure 9:
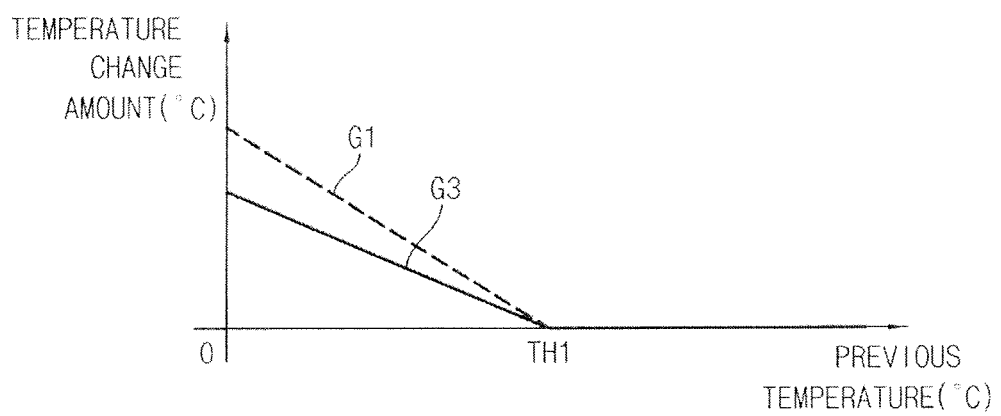
FIG. 9 is a graph illustrating a temperature change amount based on a previous temperature, which is stored in the look-up table of FIG. 8.

FIG. 9 is a graph illustrating the temperature change amount based on the previous temperature. The temperature change amount based on the previous temperature may be stored in the look-up table 500 of FIG. 8.

Referring to FIGS. 4, 8 and 9, the temperature change amount based on the previous temperature, of the case in which the grayscale of the image data IDATA is changed to the first grayscale, may be stored in the first grayscale look-up table 510 and may correspond to a first graph G1. The temperature change amount based on the previous temperature, of the case in which the grayscale of the image data IDATA is changed to the second grayscale, may be stored in the second grayscale look-up table 520 and may correspond to a third graph G3. A slope of the third graph G3 is less than that of the first graph G1. Thus, the temperature change amount of the display panel 210 based on the previous temperature of the case in which the grayscale of the image data IDATA is changed to the second grayscale, less than the first grayscale, may decrease compared to the case in which the grayscale of the image data IDATA is changed to the first grayscale.

When the grayscale of the image data IDATA is changed to a third grayscale between the first grayscale and the second grayscale, the current temperature outputting circuit 350 may calculate the temperature change amount of the display panel 210 by using the first grayscale look-up table 510 and the second grayscale look-up table 520 in an interpolation method. For example, when the grayscale of the image data IDATA is changed to the third grayscale, the current temperature outputting circuit 350 may calculate the temperature change amount by applying Equation 2.

$$TC3=TC1*W+TC2+(1-W) \quad \text{[Equation 2]}$$

Here, 'TC3' denotes the temperature change amount of the case in which the grayscale of the image data IDATA is changed to the third grayscale, 'TC1' denotes the temperature change amount of the case in which the grayscale of the image data IDATA is changed to the first grayscale, which is stored in the first grayscale look-up table 510, 'TC2' denotes the temperature change amount of the case in which the grayscale of the image data IDATA is changed to the second grayscale, which is stored in the second grayscale look-up table 520, and 'W' denotes a weighted value. The weighted value may be calculated by applying Equation 3.

$$W=(GRAY3-GRAY2)/(GRAY1-GRAY2) \quad \text{[Equation 3]}$$

Here, 'W' denotes the weighted value, 'GRAY1' denotes the first grayscale, 'GRAY2' denotes the second grayscale, and 'GRAY3' denotes the third grayscale.

For example, when the first grayscale is about 255, the second grayscale is about 182 and the third grayscale is about 218, the weighted value may be about 0.493.

In an exemplary embodiment of the present inventive concept, the current temperature outputting circuit 350 may include two grayscale look-up tables 510 and 520, but exemplary embodiments of the present inventive concept are not limited thereto. For example, the current temperature outputting circuit 350 may include a plurality of grayscale look-up tables corresponding to a plurality of grayscales.

Figure 10:
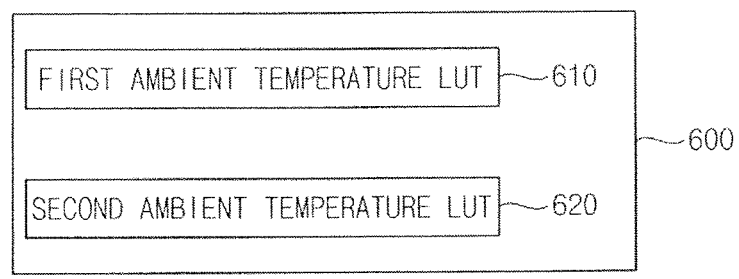
FIG. 10 is a block diagram illustrating a look-up table according to an exemplary embodiment of the present inventive concept.

FIG. 10 is a block diagram illustrating a look-up table according to an exemplary embodiment of the present inventive concept.

Referring to FIG. 10, the look-up table 600 according to an exemplary embodiment of the present inventive concept may be included in the current temperature outputting circuit 350 of the temperature estimating apparatus 300 according to an exemplary embodiment of the present inventive concept illustrated in FIG. 4. The temperature estimating apparatus 300 including the look-up table 600 may be substantially the same as the temperature estimating apparatus 300 according to an exemplary embodiment of the present inventive concept illustrated in FIG. 4 except for the look-up table 600. Thus, the same reference numerals will be used to refer to same or similar elements as those described in exemplary embodiments and any further repetitive explanation concerning the above elements will be omitted.

Referring to FIGS. 4 and 10, the look-up table 600 may include a first ambient temperature look-up table 610 and a second ambient temperature look-up table 620. The first ambient temperature look-up table 610 stores the temperature change amount based on the previous temperature of a case in which the ambient temperature AT of the display panel 210, sensed by the temperature sensor 340, is a first ambient temperature. The second ambient temperature look-up table 620 stores the temperature change amount based on the previous temperature of a case in which the ambient temperature AT of the display panel 210, sensed by the temperature sensor 340, is a second ambient temperature different from the first ambient temperature.

In an exemplary embodiment of the present inventive concept, the current temperature outputting circuit 350 may include two ambient temperature look-up tables 610 and 620, but exemplary embodiments of the present inventive concept are not limited thereto. For example, the current temperature outputting circuit 350 may include a plurality of ambient temperature look-up tables corresponding to a plurality of ambient temperatures AT.

Figure 11:
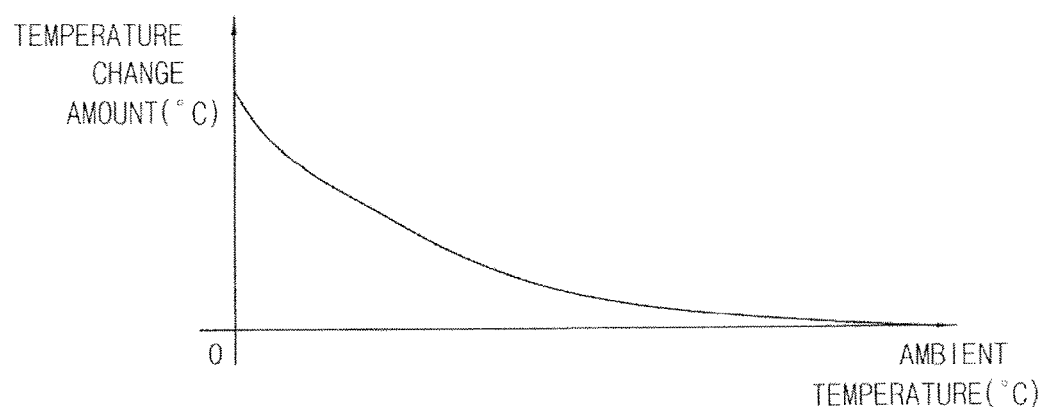
FIG. 11 is a graph illustrating a temperature change amount according to an ambient temperature of the display panel of FIG. 2.

FIG. 11 is a graph illustrating the temperature change amount based on the ambient temperature of the display panel 210 of FIG. 2.

Referring to FIGS. 2 and 11, the temperature change amount of the display panel 210 may decrease based on an increase of the ambient temperature AT.

Figure 12:
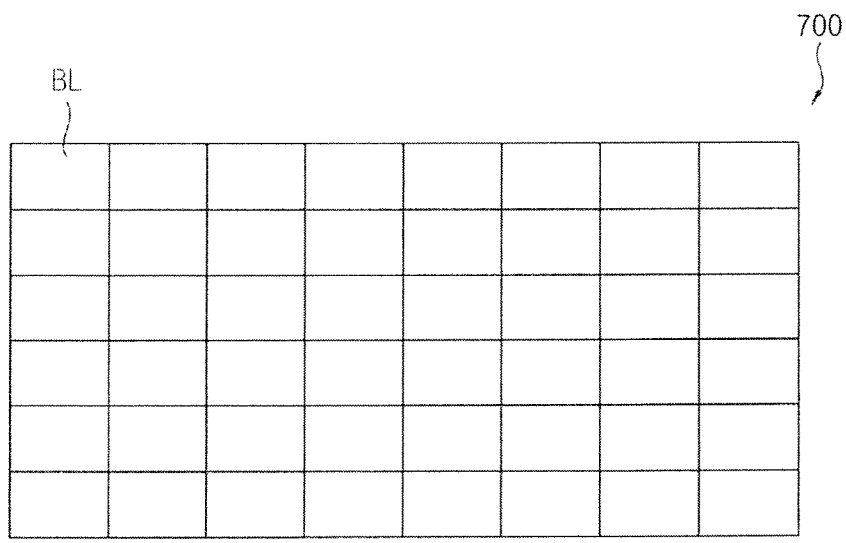
FIG. 12 is a plan view illustrating a display panel according to an exemplary embodiment of the present inventive concept.

FIG. 12 is a plan view illustrating a display panel 700 according to an exemplary embodiment of the present inventive concept.

The display panel 700 according to an exemplary embodiment of the present inventive concept illustrated in FIG. 12 may be included in the display apparatus 200 according to an exemplary embodiment of the present inventive concept illustrated in FIGS. 1 and 2. Further, the display apparatus 200 including the display panel 700 may be substantially the same as the display apparatus 200 according to an exemplary embodiment of the present inventive concept illustrated in FIGS. 1 and 2 except for the display panel 700. Thus, the same reference numerals will be used to refer to same or similar elements as those described in previous exemplary embodiments and any further repetitive explanation concerning the above elements will be omitted.

Referring to FIGS. 2, 4 and 12, the display panel 700 may include a plurality of block units BL.

The average data outputting circuit 310 calculates and outputs the average data AVDATA of the image data IDATA displayed on the display panel 700 in a block unit BL.

The change amount outputting circuit 320 determines the change amount of the average data AVDATA in the block unit BL and outputs the average data change amount ADCA.

The luminance outputting circuit 330 converts the average data change amount ADCA into the luminance LU in the block unit BL and outputs the luminance LU.

The current temperature outputting circuit 350 estimates and outputs the current temperature CT of the block unit BL.

Figure 13:
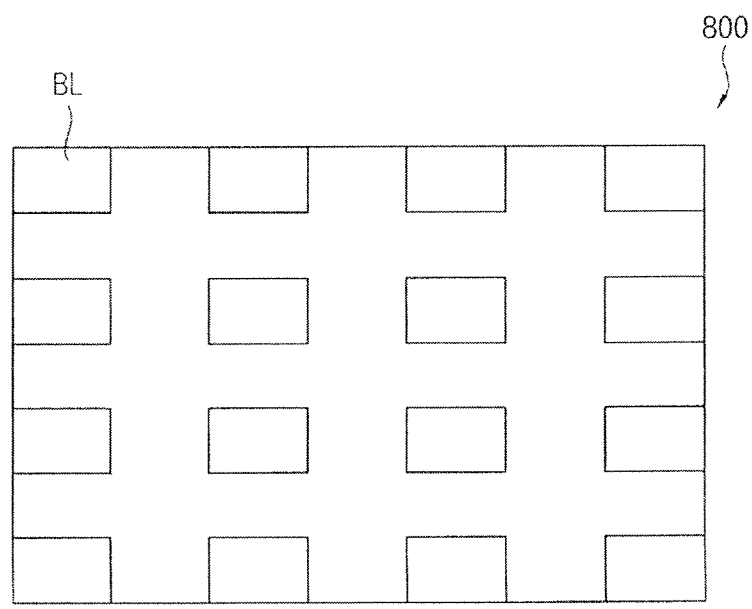
FIG. 13 is a plan view illustrating a display panel according to an exemplary embodiment of the present inventive concept.

FIG. 13 is a plan view illustrating a display panel 800 according to an exemplary embodiment of the present inventive concept.

The display panel 800 according to an exemplary embodiment illustrated in FIG. 13 may be included in the display apparatus 200 according to a previous exemplary embodiment of the present inventive concept illustrated in FIGS. 1 and 2. In addition, the display apparatus 200 including the display panel 800 may be substantially the same as the display apparatus 200 according to a previous exemplary embodiment of the present inventive concept illustrated in FIGS. 1 and 2 except for the display panel 800. Thus, the same reference numerals will be used to refer to same or similar elements as those described in previous exemplary embodiments and any further repetitive explanation concerning the above elements will be omitted.

Referring to FIGS. 2, 4 and 13, the display panel 800 may include a plurality of block units BL spaced apart from one another. For example, the plurality of blocks BL may be spaced apart from one another at a regular interval.

The average data outputting circuit 310 calculates and outputs the average data AVDATA of the image data IDATA displayed on the display panel 800 in a block unit BL.

The change amount outputting circuit 320 determines the change amount of the average data AVDATA in the block unit BL and outputs the average data change amount ADCA.

The luminance outputting circuit 330 converts the average data change amount ADCA into the luminance LU in the block unit BL and outputs the luminance LU.

The current temperature outputting circuit 350 estimates and outputs the current temperature CT of the block unit BL. In addition, the current temperature outputting circuit 350 may use an interpolation method based on the current temperatures CT of each block unit BL of the plurality of block units BL to estimate the current temperature CT between the plurality of block units BL. According to an exemplary embodiment of the present inventive concept, the current temperature outputting circuit 350 may apply different weighted values to the block units BL.

According to an exemplary embodiment of the present inventive concept, since a temperature sensor might not be disposed on the display panels 210, 700 and 800 and a temperature of a transparent display panel may be estimated, the number of temperature sensors used in estimating a temperature of the display panels 210, 700 and 800 may decrease.

The present inventive concept may be employed in all electronic devices including a display apparatus. For example, the present inventive concept may be employed in a television, a computer monitor, a notebook computer, a digital camera, a mobile phone, a smart phone, a smart pad, a tablet Personal Computer (PC), a Personal Digital Assistant (PDA), a Portable Multimedia Player (PMP), an MP3 player, a navigation device, a video phone, and the like.

While the present inventive concept has been particularly shown and described with reference to exemplary embodiments thereof, it will be apparent to those of ordinary skill in the art that various changes in form and detail may be made thereto without departing from the spirit and scope of the present inventive concept as defined by the following claims.

What is claimed is:

1. A temperature estimating apparatus, comprising:
    an average data outputting circuit configured to output average data of image data displayed on a display panel;
    a change amount outputting circuit configured to determine a change amount of the average data, and to output an average data change amount;
    a luminance outputting circuit configured to convert the average data change amount to a luminance, and to output the luminance;
    a temperature sensor configured to sense an ambient temperature of the display panel, and to output the ambient temperature; and
    a current temperature outputting circuit configured to determine a current temperature of the display panel based on a previous temperature of the display panel, the luminance and the ambient temperature.

2. The temperature estimating apparatus of claim 1, wherein the current temperature outputting circuit determines the current temperature by using a formula, 'CT=PT+TC−AT', wherein, 'CT' denotes the current temperature, 'PT' denotes the previous temperature, 'TC' denotes a temperature change amount based on the luminance, and 'AT' denotes the ambient temperature.

3. The temperature estimating apparatus of claim 1, wherein the ambient temperature is the same as a temperature of the display panel when the display panel displays a black image.

4. The temperature estimating apparatus of claim 1, further comprising:
a sensor compensating circuit configured to adjust the ambient temperature to be the same as a temperature of the display panel when the display displays a black image.

5. The temperature estimating apparatus of claim 1, wherein the change amount outputting circuit outputs the average data change amount during a first time, and
the current temperature outputting circuit determines a temperature change amount of the display panel during the first time and outputs the current temperature.

6. The temperature estimating apparatus of claim 5, wherein the current temperature outputting circuit comprises a look-up table configured to store the temperature change amount of the display panel with respect to the previous temperature of the display panel.

7. The temperature estimating apparatus of claim 6, wherein, when the average data increases during the first time, the temperature change amount increases based on a decrease of the previous temperature.

8. The temperature estimating apparatus of claim 7, wherein, when the previous temperature is greater than or equal to a first threshold temperature, the temperature change amount is about zero.

9. The temperature estimating apparatus of claim 6, wherein, when the average data decreases after the first time, the temperature change amount decreases based on a decrease of the previous temperature.

10. The temperature estimating apparatus of claim 9, wherein, when the previous temperature is greater than or equal to a second threshold temperature, the temperature change amount is substantially constant.

11. The temperature estimating apparatus of claim 6, wherein the current temperature outputting circuit comprises a first grayscale look-up table configured to store the temperature change amount of the display panel with respect to the previous temperature of the display panel, when a grayscale of the image data is changed to a first grayscale that is a maximum grayscale.

12. The temperature estimating apparatus of claim 11, wherein the temperature change amount of the display panel decreases when the grayscale of the image data is changed to a second grayscale less than the first grayscale.

13. The temperature estimating apparatus of claim 11, wherein the current temperature outputting circuit further comprises a second grayscale look-up table configured to store the temperature change amount of the display panel with respect to the previous temperature of the display panel, when the grayscale of the image data is changed to a second grayscale less than the first grayscale.

14. The temperature estimating apparatus of claim 13, wherein the current temperature outputting circuit determines the temperature change amount of the display panel by using the first grayscale look-up table and the second grayscale look-up table, when the grayscale of the image data is changed to a third grayscale that is greater than the first grayscale and less than the second grayscale.

15. The temperature estimating apparatus of claim 6, wherein the current temperature outputting circuit comprises a first ambient temperature look-up table configured to store the temperature change amount of the display panel with respect to the previous temperature of the display panel, when the ambient temperature is a first ambient temperature.

16. The temperature estimating apparatus of claim 15, wherein the current temperature outputting circuit further comprises a second ambient temperature look-up table configured to store the temperature change amount of the display panel with respect to the previous temperature of the display panel, when the ambient temperature is a second ambient temperature different from the first ambient temperature.

17. The temperature estimating apparatus of claim 16, wherein the temperature change amount of the display panel decreases when there is an increase of the ambient temperature.

18. The temperature estimating apparatus of claim 1, wherein the display panel includes a plurality of blocking units, the average data outputting circuit outputs the average data of the image data in a block unit of the plurality of block units, the change amount outputting circuit outputs the average data change amount in the block unit, the luminance outputting circuit outputs the luminance in the block unit, and the current temperature outputting circuit estimates and outputs the current temperature of the block unit.

19. A method of estimating a temperature, the method comprising:
outputting average data of image data displayed on a display panel;
determining a change amount of the average data and outputting an average data change amount;
converting the average data change amount to a luminance and outputting the luminance;
sensing an ambient temperature of the display panel and outputting the ambient temperature; and
determining a current temperature of the display panel based on a previous temperature of the display panel, the luminance and the ambient temperature and outputting the current temperature of the display panel.

20. A display system, comprising:
a display apparatus comprising a display panel configured to display image data, and a display panel driving apparatus configured to drive the display panel; and
a temperature estimating apparatus comprising:
an average data outputting circuit configured to output average data of image data displayed on the display panel;
a change amount outputting circuit configured to determine a change amount of the average data, and to output an average data change amount;
a luminance outputting circuit configured to convert the average data change amount to a luminance, and to output the luminance;
a temperature sensor configured to sense an ambient temperature of the display panel, and to output the ambient temperature; and
a current temperature outputting circuit configured to store a previous temperature of the display panel, to estimate a current temperature of the display panel based on the previous temperature, the luminance and the ambient temperature, and to output the current temperature of the display panel; and an afterimage compensating apparatus configured to compensate the image data by using the current temperature of the display panel as an afterimage acceleration coefficient.

* * * * *